US011214639B2

(12) United States Patent
Tardif et al.

(10) Patent No.: US 11,214,639 B2
(45) Date of Patent: Jan. 4, 2022

(54) COPOLYMER, RUBBER COMPOSITION, RESIN COMPOSITION, TIRE AND RESIN PRODUCT

(71) Applicant: Bridgestone Corporation, Tokyo (JP)

(72) Inventors: Olivier Tardif, Tokyo (JP); Aya Yanagisawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 16/892,370

(22) Filed: Jun. 4, 2020

(65) Prior Publication Data

US 2020/0299432 A1 Sep. 24, 2020

Related U.S. Application Data

(63) Continuation of application No. PCT/JP2018/035187, filed on Sep. 21, 2018.

(30) Foreign Application Priority Data

Dec. 5, 2017 (JP) .............................. JP2017-233815

(51) Int. Cl.
*C08F 210/18* (2006.01)
*B60C 1/00* (2006.01)

(52) U.S. Cl.
CPC .............. *C08F 210/18* (2013.01); *B60C 1/00* (2013.01)

(58) Field of Classification Search
USPC ........................................................ 526/339
See application file for complete search history.

(56) References Cited

U.S. PATENT DOCUMENTS

| 7,956,132 B2 * | 6/2011 | Arriola ................... C08C 19/28 525/324 |
| 2002/0045710 A1 | 4/2002 | Nishihara et al. |
| 2006/0160969 A1 | 7/2006 | Boisson et al. |
| 2009/0270578 A1* | 10/2009 | Boisson ................. C08F 236/04 526/339 |
| 2012/0059135 A1 | 3/2012 | Michiue et al. |
| 2013/0197157 A1 | 8/2013 | Kaita et al. |

FOREIGN PATENT DOCUMENTS

| EP | 0 275 676 A1 | 7/1988 |
| EP | 3722337 A1 | 10/2020 |
| JP | 01-501633 A | 6/1989 |
| JP | 2019-99721 A | 6/2019 |
| WO | 2001/048079 A1 | 7/2001 |
| WO | 2010/113975 A1 | 10/2010 |
| WO | 2012/014455 A1 | 2/2012 |

OTHER PUBLICATIONS

International Preliminary Report on Patentability with a Translation of Written Opinion in International Application No. PCT/JP2018/035187, dated Jun. 9, 2020.
International Search Report for PCT/JP2018/035187 dated Dec. 18, 2018 [PCT/ISA/210].
Extended European Search Report dated Aug. 6, 2021 in Application No. 18885711.4.
Rui Tan et al., "The terpolymerization of ethylene and propylene with isoprene via THF-containing half-sandwich scandium catalysts: a new kind of ethylene-propylene-diene rubber and its functionalization", Polymer Chemistry, 2017, vol. 8, No. 32, pp. 4651-4658 (9 pages total).

* cited by examiner

*Primary Examiner* — Fred M Teskin
(74) *Attorney, Agent, or Firm* — Sughrue Mion, PLLC (57) ABSTRACT

An object of the present disclosure is to provide a copolymer excellent in fracture resistance, ozone resistance and wear resistance. In order to achieve the object, the present disclosure provides a copolymer containing at least an ethylene unit, a $C_{4-10}$ non-conjugated olefin unit and a conjugated diene unit, wherein a content of 3,4 or 1,2-vinyl bond in the conjugated diene unit is equal to or larger than 30 mol %.

19 Claims, 3 Drawing Sheets

FIG. 1

COPOLYMER, RUBBER COMPOSITION, RESIN COMPOSITION, TIRE AND RESIN PRODUCT

TECHNICAL FIELD

The present invention relates to a copolymer, a rubber composition, a resin composition, a tire, and a resin product.

BACKGROUND ART

In general, a rubber product (such as a tire, a conveyor belt, a rubber damper, quake-absorbing rubber or the like) and a resin product are required to be excellent in durability (fracture resistance, wear resistance, resistance to crack growth, and the like) and weatherproofness (ozone resistance and the like). A variety of polymers or copolymers have been developed to satisfy such a demand of rubber and resin products as described above.

For example, PTL 1 discloses a copolymer of a conjugated diene compound and a non-conjugated olefin, wherein a conjugated diene unit thereof (derived from the conjugated diene compound) has a cis-1,4 bond content of greater than 70.5 mol % and the non-conjugated olefin is contained in an amount of 10 mol % or more. PTL 1 also discloses that the copolymer is used for manufacturing a rubber composition being excellent in weatherproofness and resistance to crack growth.

CITATION LIST

Patent Literature

PTL 1: WO2012/014455

SUMMARY OF THE INVENTION

Technical Problems

However, the inventors of the present disclosure discovered as a result of a study that the copolymer of PTL 1, although it is excellent in resistant to crack growth, still has room for improvement in other physical properties, fracture resistance, ozone resistance and wear resistance in particular.

An object of the present disclosure is therefore to solve the aforementioned prior art problems and provide a copolymer excellent in fracture resistance, ozone resistance and wear resistance.

Another object of the present disclosure is to provide a rubber composition, a resin composition, a tire, and a resin product, each of which contains the copolymer and is excellent in fracture resistance, ozone resistance and wear resistance.

The present disclosure has been contrived in order to solve the aforementioned problems and the primary features thereof are as follows.

A copolymer of the present disclosure is a copolymer containing at least an ethylene unit, a $C_{4-10}$ non-conjugated olefin unit and a conjugated diene unit, wherein a content of 3,4 or 1,2-vinyl bond in the conjugated diene unit is equal to or larger than 30 mol %.

The copolymer of the present disclosure is excellent in fracture resistance, ozone resistance and wear resistance.

It is preferable that the copolymer of the present disclosure has a weight average molecular weight (Mw) of ≥50,000. Wear resistance of the copolymer further improves in this case. A "weight average molecular weight (Mw)" represents a value measured by the method described in "EXAMPLES" below in the present disclosure.

It is preferable that in the copolymer of the present disclosure a content of the ethylene unit therein is in the range of 80 to 96 mol %, a content of the non-conjugated olefin unit therein is in the range of 3 to 19 mol %, and a content of the conjugated diene unit therein is in the range of 1 to 17 mol %.

Fracture resistance and wear resistance of the copolymer further improve, respectively, and crosslinking property of the copolymer and workability in a mixing and kneading process of a composition using the copolymer are satisfactory, as well, in this case.

The melting point of the copolymer of the present disclosure, measured by differential scanning calorimetry (DSC), is preferably 120° C. or lower. Workability in a mixing and kneading process of a composition using the copolymer improves in this case. A "melting point" represents a value measured by the method described in "EXAMPLES" below in the present disclosure.

The copolymer of the present disclosure has a degree of crystallinity preferably in the range of 5.0 to 50%. Fracture resistance of the copolymer further improves and workability in mixing and kneading of a composition using the copolymer and workability in attaching rubber members made of a rubber composition using the copolymer to each other, to build a rubber product, also improve, respectively, in this case. A "degree of crystallinity" represents a value measured by the method described in "EXAMPLES" below in the present disclosure.

It is preferable that a main chain of the copolymer of the present disclosure is constituted of only acyclic structures.

In a preferable example of the copolymer of the present disclosure, the non-conjugated olefin unit is an α-olefin unit. A non-conjugated olefin compound, from which the non-conjugated olefin unit is derived, is easily available and thus production cost of the copolymer can be reduced in this case.

The non-conjugated olefin unit is preferably at least one selected from 1-hexene unit and 1-octene unit. A non-conjugated olefin compound, from which the non-conjugated olefin unit is derived, is more easily available and thus production cost of the copolymer can be further reduced than otherwise in this case.

In another preferable example of the copolymer of the present disclosure, the conjugated diene unit includes 1,3-butadiene unit and/or isoprene unit. A conjugated diene compound, from which the conjugated diene unit is derived, is easily available and thus production cost of the copolymer can be reduced in this case.

A rubber composition of the present disclosure is characterized in that it contains the aforementioned copolymer. The rubber composition of the present disclosure is excellent in fracture resistance, ozone resistance and wear resistance.

A resin composition of the present disclosure is characterized in that it contains the aforementioned copolymer. The resin composition of the present disclosure is excellent in fracture resistance, ozone resistance and wear resistance.

In the present disclosure, a "rubber composition" represents a composition which exhibits rubber-like elasticity at the room temperature and a "resin composition" represents a composition which is relatively hard and does not exhibit rubber-like elasticity at the room temperature, so that they are distinguished from each other accordingly.

A tire of the present disclosure is characterized in that it uses the aforementioned rubber composition. The tire of the present disclosure is excellent in fracture resistance, ozone resistance and wear resistance.

A resin product of the present disclosure is characterized in that it uses the aforementioned resin composition. The resin product of the present disclosure is excellent in fracture resistance, ozone resistance and wear resistance.

According to the present disclosure, it is possible to provide a copolymer excellent in fracture resistance, ozone resistance and wear resistance.

Further, according to the present disclosure, it is possible to provide a rubber composition, a resin composition, a tire, and a resin product, each of which is excellent in fracture resistance, ozone resistance and wear resistance.

DETAILED DESCRIPTION

Hereinafter, a copolymer, a rubber composition, a resin composition, a tire, and a resin product of the present disclosure will be demonstratively described in detail based on embodiments thereof.

<Copolymer>

A copolymer of the present disclosure is a copolymer containing at least an ethylene unit, a $C_{4-10}$ non-conjugated olefin unit and a conjugated diene unit, wherein a content of 3,4 or 1,2-vinyl bond in the conjugated diene unit is equal to or larger than 30 mol %.

The copolymer of the present disclosure, containing an ethylene unit, is excellent in fracture resistance and wear resistance because the ethylene unit has a high degree of crystallinity.

Further, the copolymer of the present disclosure, containing a conjugated diene unit such that a content of 3,4 or 1,2-vinyl bond in the conjugated diene unit is equal to or larger than 30 mol %, has a large number of unsaturated bonds in side chains thereof and thus exhibits low reactivity of a main chain thereof. Accordingly, the copolymer of the present disclosure exhibits higher ozone resistance than a copolymer having a large number of unsaturated bonds in a main chain thereof.

Yet further, the copolymer of the present disclosure, containing a non-conjugated olefin unit, is excellent in ozone resistance because the non-conjugated olefin unit does not include unsaturated bonds.

Accordingly, the copolymer of the present disclosure is excellent in fracture resistance, ozone resistance and wear resistance.

The copolymer of the present disclosure contains at least an ethylene unit, a $C_{4-10}$ non-conjugated olefin unit and a conjugated diene unit. The copolymer may either be constituted exclusively of an ethylene unit, a $C_{4-10}$ non-conjugated olefin unit and a conjugated diene unit or further include other monomer units.

The ethylene unit is derived from ethylene. A content of the ethylene unit is preferably in the range of 80 to 96 mol % and more preferably in the range of 80 to 94 mol % in the copolymer of the present disclosure. A sufficient amount of crystals derived from the ethylene unit can be generated in the copolymer when a content of the ethylene unit therein is ≥80 mol %, so that fracture resistance of the copolymer is further improved. Characteristics attributed to the $C_{4-10}$ non-conjugated olefin unit and the conjugated diene unit are expressed in a satisfactorily explicit manner when a content of the ethylene unit in the copolymer is ≤96 mol %.

The $C_{4-10}$ non-conjugated olefin unit is derived from a $C_{4-10}$ non-conjugated olefin compound. The non-conjugated olefin compound represents an aliphatic unsaturated hydrocarbon compound having at least one carbon-carbon double bond, wherein no carbon-carbon double bonds are in conjugation when a plurality of carbon-carbon double bonds exists, in the present disclosure. Examples of the non-conjugated olefin compound include: α-olefin such as 1-butene, 1-pentene, 1-hexene, 1-heptene, 1-octene, and the like; a heteroatom-substituted alkene compound such as vinyl pivalate, 1-phenylthio ethene, N-vinylpyrrolidone; and the like. The non-conjugated olefin compound is preferably α-olefin and particularly preferably 1-hexene or 1-octene among these examples. A non-conjugated olefin compound like α-olefin, in particular 1-hexene or 1-octene, has a double bond at α-position of the olefin, whereby the compound can be effectively polymerized with a conjugated diene compound described below and can further improve, when it is used for a copolymer, ozone resistance of a rubber composition, a tire or the like using the copolymer.

In the copolymer of the present disclosure, it is preferable that the non-conjugated olefin unit is constituted of an α-olefin unit and it is more preferable that the non-conjugated olefin unit is constituted of at least one selected from 1-hexene unit and 1-octene unit. In a case where the non-conjugated olefin unit is constituted of an α-olefin unit, a non-conjugated olefin compound from which the non-conjugated olefin unit is derived is easily available and thus production cost of the copolymer can be reduced. In a case where the non-conjugated olefin unit is constituted of 1-hexene unit and/or 1-octene unit, a non-conjugated olefin compound from which the non-conjugated olefin unit is derived is more easily available and thus production cost of the copolymer can be further reduced than otherwise.

In the copolymer of the present disclosure, a content of the non-conjugated olefin unit is preferably in the range of 3 mol % to 19 mol % and more preferably in the range of 3 mol % to 17 mol %. The glass transition temperature (Tg) of the copolymer decreases when a content of the non-conjugated olefin unit therein is ≥3 mol %, so that wear resistance of the copolymer further improves. Characteristics attributed to the ethylene unit and the conjugated diene unit are expressed in a satisfactorily explicit manner when a content of the non-conjugated olefin unit in the copolymer is ≤19 mol %.

The conjugated diene unit is derived from a conjugated diene compound. Although type of the conjugated diene compound is not particularly restricted, the conjugated diene compound preferably has four to eight carbon atoms. Specific examples of the conjugated diene compound include 1,3-butadiene, isoprene, 1,3-pentadiene, 2,3-dimethylbutadiene, and the like. 1,3-butadiene and isoprene are preferable and isoprene is particularly preferable among these examples.

In the copolymer of the present disclosure, the conjugated diene unit preferably includes 1,3-butadiene unit and/or isoprene unit. When the conjugated diene unit includes 1,3-butadiene unit and/or isoprene unit, a conjugated diene compound from which the conjugated diene unit is derived (i.e. 1,3-butadiene, isoprene) is easily available and thus production cost of the copolymer can be reduced.

In the copolymer of the present disclosure, a content of the conjugated diene unit is preferably in the range of 1 mol % to 17 mol % and more preferably in the range of 2 mol % to 15 mol %. The copolymer has satisfactory crosslinking property and thus can be easily vulcanized when a content of the conjugated diene unit in the copolymer is ≥1 mol %. Further, workability in mixing and kneading of a rubber composition and a resin composition using the copolymer can be made satisfactory, as well, in this case. Ozone resistance of the copolymer further improves when a content of the conjugated diene unit in the copolymer is ≤17 mol %.

In the copolymer of the present disclosure, a content of 3,4 or 1,2-vinyl bond in the conjugated diene unit is ≥30 mol %, preferably ≥35 mol %, more preferably ≥40 mol %, further more preferably ≥45 mol %, and particularly preferably ≥50 mol %. A main chain exhibits high reactivity and ozone resistance of the copolymer deteriorates when a content of 3,4 or 1,2-vinyl bond in the conjugated diene unit is less than 30 mol %.

The upper limit of a content of 3,4 or 1,2-vinyl bond in the conjugated diene unit is not particularly restricted. That is, a content of 3,4 or 1,2-vinyl bond in the conjugated diene unit is ≤100 mol %.

It is preferable in the copolymer of the present disclosure that a content of the ethylene unit thereof is in the range of 80 to 96 mol %, a content of the non-conjugated olefin unit thereof is in the range of 3 to 19 mol %, and a content of the conjugated diene unit thereof is in the range of 1 to 17 mol %.

A sufficient amount of crystals derived from the ethylene unit can be generated in the copolymer when a content of the ethylene unit therein is ≥80 mol %, so that fracture resistance of the copolymer further improves.

The glass transition temperature (Tg) of the copolymer decreases when a content of the non-conjugated olefin unit therein is ≥3 mol %, so that wear resistance of the copolymer further improves.

The copolymer has satisfactory crosslinking property when a content of the conjugated diene unit in the copolymer is ≥1 mol %.

A large content of the ethylene unit in a copolymer tends to deteriorate workability in mixing and kneading of a composition using the copolymer. However, the copolymer of the present disclosure can suppress such deterioration of workability because it contains the conjugated diene unit by ≥1 mol %. A large content of the conjugated diene unit in a copolymer tends to deteriorate ozone resistance of the copolymer. However, the copolymer of the present disclosure can improve ozone resistance thereof because it contains the non-conjugated olefin unit by ≥3 mol %.

In short, fracture resistance and wear resistance of the copolymer further improve, respectively, and crosslinking property of the copolymer and workability in a mixing and kneading process of a composition using the copolymer are satisfactory, as well, when a content of the ethylene unit of the copolymer is in the range of 80 to 96 mol %, a content of the non-conjugated olefin unit thereof is in the range of 3 to 19 mol %, and a content of the conjugated diene unit thereof is in the range of 1 to 17 mol %.

It is preferable that a main chain of the multi-component copolymer of the present disclosure is constituted of only acyclic structures. A "main chain" represents a long chain portion formed by the respective units of which bonding ends are bonded to each other, of the copolymer, in the present disclosure. A "main chain" does not include, among the respective units constituting the copolymer, a branched portion (i.e. a pendant group) not bonded to the adjacent units of the main chain of the copolymer. For example, in a case where an aromatic vinyl compound is used as one of component monomers, a "main chain" of a resulting multi-component copolymer does not include the aromatic ring existing in a unit derived from the aromatic vinyl compound constituting the multi-component copolymer. In other words, the aromatic ring in a unit derived from the aromatic vinyl compound constituting the multi-component copolymer is not included in a main chain of the multi-component copolymer unless the aromatic ring itself is bonded to the adjacent another unit of the main chain.

Further, the phrase of "a main chain is constituted of only acyclic structures" represents that the main chain includes none of an alicyclic structure, an aromatic structure and a heterocyclic structure. For example, a multi-component copolymer of which main chain is constituted of only acyclic structures can be manufactured by forming a main chain through addition polymerization, not involving a ring forming reaction, of ethylene, a $C_{4-10}$ non-conjugated olefin compound and a conjugated diene compound in the copolymerization process. NMR is employed as a primary measurement means for determining whether a main chain of the copolymer is constituted of only acyclic structures or not. Specifically, when a peak derived from a cyclic structure existing in a main chain (e.g. any of peaks appearing in a range of 10 ppm to 24 ppm in cases of three-membered, four-membered, and five-membered alicyclic structures) is not observed, the result indicates that the main chain of the copolymer is constituted exclusively of acyclic structures.

Yet further, a main chain of the multi-component copolymer of the present disclosure may either be constituted exclusively of a normal chain or include a side chain.

The copolymer of the present disclosure has a weight average molecular weight (Mw) preferably of ≥50,000, more preferably of ≥100,000, and further more preferably of ≥150,000. Wear resistance of the copolymer further improves when the weight average molecular weight (Mw) thereof is ≥50,000. The weight average molecular weight (Mw) of the copolymer is preferably ≤10,000,000, more preferably ≤5,000,000, and further more preferably ≤1,000,000 in terms of achieving satisfactory workability.

The copolymer of the present disclosure has a molecular weight distribution (Mw/Mn), represented by a ratio of the weight average molecular weight (Mw) with respect to the number average molecular weight (Mn), preferably of ≤6.0, more preferably of ≤5.0, and particularly preferably of ≤4.0. It is possible to make physical properties of the copolymer satisfactorily uniform by setting the molecular weight distribution of the copolymer to be ≤6.0. A "molecular weight distribution (Mn)" represents a value measured by the method described in "EXAMPLES" below in the present disclosure.

In the copolymer of the present disclosure, the melting point thereof measured by differential scanning calorimetry (DSC) is preferably equal to or lower than 120° C., more preferably equal to or lower than 115° C., and further more preferably equal to or lower than 110° C. Workability of the copolymer improves when the melting point of the copolymer is equal to or lower than 120° C. In a case where the melting point of the copolymer exceeds 120° C., the ethylene unit having a high degree of crystallinity fails to smoothly melt in a mixing and kneading process of a rubber composition or a resin composition described below, thereby possibly deteriorating workability in the process.

The melting point, measured by DSC, of the copolymer of the present disclosure is preferably equal to or higher than 50° C., more preferably equal to or higher than 60° C., and further more preferably equal to or higher than 70° C. The melting point of ≥50° C., of the copolymer, is advantageous in terms of further improving fracture resistance thereof.

The copolymer of the present disclosure has a degree of crystallinity preferably in the range of 5.0% to 50%. When a degree of crystallinity of the copolymer is ≥5.0%, crystallinity attributed to the ethylene unit is well ensured and fracture resistance of the copolymer further improves. When a degree of crystallinity of the copolymer is ≤50%, workability in a mixing and kneading process of a rubber composition and a resin composition described below improves and workability in attaching rubber members made of the rubber composition to each other to form a rubber product such as a tire also improves because of improved tackiness of the rubber composition containing the copolymer. A degree of crystallinity of the copolymer is more preferably ≥10% in terms of obtaining satisfactory fracture resistance and ≤40% in terms of obtaining satisfactory workability.

There is no strong correlation between a high/low melting point and a high/low degree of crystallinity in the copolymer. A degree of crystallinity of the copolymer is decided by various factors such as a physical state in which the crystal components exist in the copolymer (e.g. a chain length of the ethylene unit), and the like.

<Production Method for Copolymer>

The copolymer of the present disclosure described above can be obtained by, for example, copolymerizing at least ethylene, a $C_{4-10}$ non-conjugated olefin compound and a conjugated diene compound under the presence of a polymerization catalyst composition including a rare earth element component (A) represented by the following general formula (I):

(I)

[In general formula (I), M represents scandium, yttrium or a lanthanoid element; Cp represents a group selected from cyclopentadienyl, indenyl, fluorenyl groups and derivatives thereof; each of X and X' represents hydrogen atom, halogen atom, alkoxy, thiolate, amide, silyl, or a $C_{1-20}$ hydrocarbon group; the $C_{1-20}$ hydrocarbon group may have a group containing silicon, oxygen, nitrogen, sulfur or phosphor at a terminal/between terminals thereof; X and X' may be of either the same type or different types; "a" and "b" each independently represent an integer in the range of 0 to 3, wherein a+b≥1; L represents a neutral Lewis base; and "c" represents an integer in the range of 0 to 3.]

The core metal M in general formula (I) is scandium, yttrium or a lanthanoid element. The lanthanoid elements include 15 elements having atomic numbers 57-71 in the periodic table and any of these elements is acceptable. Preferable examples of the core metal M include scandium Sc, yttrium Y, samarium Sm, neodymium Nd, praseodymium Pr, gadolinium Gd, cerium Ce, and holmium Ho.

Cp in general formula (I) represents a group selected from cyclopentadienyl, indenyl, fluorenyl groups and derivatives thereof.

In respect of Cp in general formula (I), a derivative of the cyclopentadienyl group (a substituted cyclopentadienyl group) can be represented as $C_5H_{5-A}R_A$, wherein A is an integer in the range of 1 to 4, representing the number of substituent groups existing on the substituted cyclopentadienyl group; A is preferably ≥2; R represents a substituent group and Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, cyclopentanyl, phenyl, benzyl groups and the like. It is preferable that at least one of Rs is an aromatic group such as phenyl group, benzyl group, or the like. In a case where A is ≥2 and/or R has a bulky substituent group such as an aromatic group, Cp itself becomes bulky and makes due to the steric hindrance thereof a monomer to be polymerized approach the core metal M of the compound represented by general formula (I) from the X or X' side, thereby facilitating introduction of a vinyl portion of a non-conjugated olefin compound to a reaction site. On the other hand, examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group, t-butyldimethylsilyl group, benzyldimethylsilyl group, and the like. Specific examples of the substituted cyclopentadienyl include compounds represented by the following structural formulae:

(In these structural formulae, R' represents methyl or ethyl group and R represents hydrogen atom, methyl or ethyl group.)

The substituted cyclopentadienyl group may have phenanthrene. Examples of a derivative of the cyclopentadienyl group include (1-benzyldimethylsilyl)cyclopenta[I] phenanthrene, and the like.

In respect of Cp in general formula (I), a derivative of the indenyl group (a substituted indenyl group) can be represented as $C_9H_{7-A}R_A$ or $C_9H_{11-A}R_A$, wherein A is an integer in the range of 1 to 7 or 1 to 11, representing the number of substituent groups existing on the substituted indenyl group; A is preferably ≥2; R preferably exists on the five-membered ring of the substituted indenyl group; R represents a substituent group and Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, cyclopentanyl, phenyl, benzyl groups and the like. It is preferable that at least one of Rs is an aromatic group such as phenyl group, benzyl group, or the like. In a case where A is ≥2 and/or R has a bulky substituent group such as an aromatic group, Cp itself becomes bulky and makes due to the steric hindrance thereof a monomer to be polymerized approach the core metal M of the compound represented by general formula (I) from the X or X' side, thereby facilitating introduction of a vinyl portion of a non-conjugated olefin compound to a reaction site. On the other hand, examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group, t-butyldimethylsilyl group, benzyldimethylsilyl group, and the like. Specific examples of the substituted indenyl group include 2-phenylindenyl, 2-methylindenyl, 1-methyl-2-phenylindenyl, 1,3-bis(t-butyldimethylsilyl)indenyl, 1-ethyl-2-phenylindenyl, 1-benzyl-2-phenylindenyl, (1-benzyldimethylsilyl-3-cyclopentyl)indenyl, (1-benzyl-3-t-butyldimethylsilyl)indenyl, and the like. The substituted indenyl group may have phenanthrene.

In respect of Cp in general formula (I), a derivative of the fluorenyl group (a substituted fluorenyl group) can be represented as $C_{13}H_{9-A}R_A$ or $C_{13}H_{17-A}R_A$, wherein A is an integer in the range of 1 to 9 or 1 to 17, representing the number of substituent groups existing on the substituted fluorenyl group; A is preferably ≥2; R represents a substituent group and Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, cyclopentanyl, phenyl, benzyl groups and the like. It is preferable that at least one of Rs is an aromatic group such as phenyl group, benzyl group, or the like. In a case where A is ≥2 and/or R has a bulky substituent group such as an aromatic group, Cp itself becomes bulky and makes due to the steric hindrance thereof a monomer to be polymerized approach the core metal M of the compound represented by general formula (I) from the X or X' side, thereby facilitating introduction of a vinyl portion of a non-conjugated olefin compound to a reaction site. On the other hand, examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group, t-butyldimethylsilyl group, benzyldimethylsilyl group, and the like. The substituted fluorenyl group may have phenanthrene.

In general formula (I), each of X and X' represents hydrogen atom, halogen atom, alkoxy, thiolate, amide, silyl, or a $C_{1-20}$ hydrocarbon group, wherein the $C_{1-20}$ hydrocarbon group may have a group containing silicon, oxygen, nitrogen, sulfur or phosphor at a terminal/between terminals thereof; and X and X' may be of either the same type or different types.

Acceptable examples of the halogen atom represented by X and/or X' in general formula (I) include fluorine, chlorine, bromine and iodine atoms. Chlorine or bromine atom is preferable.

In general formula (I), examples of the alkoxy group represented by X and/or X' include: aliphatic alkoxy group such as methoxy, ethoxy, propoxy, n-butoxy, isobutoxy, sec-butoxy, tert-butoxy, and the like; and aryloxy group such as phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy, and the like. 2,6-di-tert-butylphenoxy is preferable as the alkoxy group among these examples.

Examples of the thiolate group represented by X and/or X' in general formula (I) include: aliphatic thiolate group such as thiomethoxy, thioethoxy, thiopropoxy, n-thiobutoxy, thoisobutoxy, sec-thiobutoxy, tert-thiobutoxy, and the like; and arylthiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like. 2,4,6-triisopropylthiophenoxy is preferable as the thiolate group among these examples.

Examples of the amide group represented by X and X' in general formula (I) include: aliphatic amide group such as dimethylamide, diethylamide, diisopropylamide, and the like; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-butyl-6-neopentylphenylamide, 2-isopropyl-6-neopentylphenylamide, 2,4,6-tri-tert-butylphenylamide, and the like; and bis(trialkylsilyl)amide such as bis(trimethylsilyl)amide; and the like. Bis(trimethylsilyl)amide group is preferable as the amide group among these examples.

Examples of the silyl group represented by X and X' in general formula (I) include trimethylsilyl, tris(trimethylsilyl)silyl, bis(trimethylsilyl)methylsilyl, trimethylsilyl(dimethyl)silyl, (triisopropylsilyl)bis(trimethylsilyl)silyl, and the like. Tris(trimethylsilyl)silyl group is preferable as the silyl group among these examples.

Specific examples of the $C_{1-20}$ hydrocarbon group represented by X and X' in general formula (I) include: normal/branched aliphatic hydrocarbon group such as methyl, ethyl, n-propyl, isopropyl, n-butyl, isobutyl, sec-butyl, tert-butyl, neopentyl, hexyl, octyl, and the like; aromatic hydrocarbon group such as phenyl, tolyl, naphthyl, and the like; aralykyl group such as benzyl, and the like; a hydrocarbon group containing silicon atom such as trimethylsilylmethyl, bis(trimethylsilyl)methyl; and the like. Methyl, ethyl, isobutyl, trimethylsilylmethyl, and the like are preferable as the $C_{1-20}$ hydrocarbon group among these examples.

The rare earth element compound (A) represented by general formula (I) further includes 0 to 3, preferably 0 to 1, neutral Lewis base L. Examples of the neutral Lewis base L include tetrahydrofuran, diethyl ether, dimethylaniline, trimethylphosphine, lithium chloride, neutral olefins, neutral diolefins, and the like. The neutral Lewis bases L may be of either the same type or different types when the rare earth element compound (A) includes a plurality of neutral Lewis bases L.

The rare earth element compound (A) represented by general formula (I) may exist as any of monomer, dimer or another type of multimer.

The polymerization catalyst composition preferably further includes an organic metal compound (B) represented by the following general formula (II):

$$ZR^1_e R^2_f R^3_g \qquad (II)$$

(In general formula (II), Z represents a metal element selected from the group 1, 2, 12 and 13 elements in the periodic table, $R^1$ and $R^2$ each represent a $C_{1-10}$ hydrocarbon group or a hydrogen atom, $R^3$ represents a $C_{1-10}$ hydrocarbon group, $R^1$, $R^2$ and $R^3$ may be of either the same type or different types, e=1 and f=g=0 when Z is a metal element selected from the group 1 elements in the periodic table, e=f=1 and g=0 when Z is a metal element selected from the groups 2, 12 elements in the periodic table, and e=f=g=1 when Z is a metal element selected from the group 13 elements in the periodic table.)

In the general formula (II), specific examples of the $C_{1-10}$ hydrocarbon group represented by $R^1$, $R^2$ and $R^3$ include: a normal/branched aliphatic hydrocarbon group such as methyl, ethyl, n-propyl, isopropyl, n-butyl, isobutyl, sec-butyl, tert-butyl, neopentyl, hexyl, octyl group, and the like, an aromatic hydrocarbon group such as phenyl, tolyl, naphthyl group, and the like; an aralkyl group such as benzyl group; and the like. Methyl, ethyl, isobutyl groups and the like are preferable among these examples.

The organic metal component (B) is preferably an organic aluminum compound represented by the following general formula (IIa):

(In general formula (IIa), $R^1$ and $R^2$ each represent a $C_{1-10}$ hydrocarbon group or a hydrogen atom and $R^3$ represents a $C_{1-10}$ hydrocarbon group, wherein $R^1$, $R^2$ and $R^3$ may be of either the same type or different types.)

The organic aluminum compound corresponds to a compound represented by general formula (II) in which Z is Al and e=f=g=1.

Examples of the organic aluminum compound represented by general formula (IIa) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, isobutylaluminum dihydride, and the like. Triethylaluminum, triisobutylaluminum, hydrogenated diethylaluminum and hydrogenated diisobutylaluminum are preferable as the organic aluminum compound among these examples.

Either a single type or combination of two or more types of the aforementioned examples may be used as the organic metal compound (B).

A ratio of a content of the organic metal compound (B) with respect to a content of the rare earth element compound (A) in the polymerization catalyst composition (a ratio of an amount of the organic metal compound (B) with respect to an amount of the rare earth element compound (A) in the polymerization system), i.e. a mole ratio of the organic metal compound (B)/the rare earth element compound (A), is preferably ≥3, more preferably ≥5, preferably ≤50, more preferably ≤40, and further more preferably ≤30 in terms of achieving satisfactory reaction activity.

The polymerization catalyst composition preferably further includes an ionic compound (C). The ionic compound (C) is constituted of a non-coordinating anion and a cation. Examples of the ionic compound (C) include an ionic compound or the like capable of being reacted with the rare earth element component (A) and generating a cationic transition metal compound.

Examples of the non-coordinating anion include quadrivalent boron anion such as tetraphenylborate, tetrakis(monofluorophenyl)borate, tetrakis(difluorophenyl)borate, tetrakis(trifluorophenyl)borate, tetrakis(tetrafluomphenyl)borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

Examples of the cation include carbonium cation, oxonium cation, ammonium cation, phosphonium cation, cycloheptatrienyl cation, ferrocenium cation having transition metal, trityl cation, and the like. Specific examples of the carbonium cation include trisubstituted carbonium cation such as triphenylcarbonium cation, tri(substituted phenyl)carbonium cation, and the like. Specific examples of the tri (substituted phenyl)carbonium cation include tri(methylphenyl)carbonium cation, tri(dimethylphenyl)carbonium cation, and the like. Specific examples of the ammonium cation include: trialkylammonium cation such as trimethylammonium cation, triethylammonium cation, tripropylammonium cation, tributylammonium cation (e.g. tri(n-butyl)ammonium cation); N,N-dialkylanilinium cation such as N,N-dimethylanilinium cation, N,N-diethylanilinium cation, N,N-2,4,6-pentamethylanilinium cation: dialkylammonium cation such as diisopropylammonium cation, dicyclohexylammonium cation; and the like. Specific examples of phosphonium cation include triarylphosphonium cation such as triphenylphosphonium cation, tri(methylphenyl)phosphonium cation, tri(dimethylphenyl)phosphonium cation, and the like.

Accordingly, a compound as a combination of a non-coordinating anion and a cation respectively selected from the aforementioned examples is preferably used as the ionic compound (C). Specifically, N,N-dimethylanilinium tetrakis (pentafluorophenyl)borate, triphenylcarbonium tetrakis (pentafluorophenyl)borate, trityl tetrakis(pentafluorophenyl)borate, and the like are preferable as the ionic compound (C).

Either a single type or combination of two or more types of the aforementioned examples may be used as the ionic compound (C).

A ratio of a content of the ionic compound (C) with respect to a content of the rare earth element compound (A) in the polymerization catalyst composition (a ratio of an amount of the ionic compound (C) with respect to an amount of the rare earth element compound (A) in the polymerization system), i.e. a mole ratio of the ionic compound (C)/the rare earth element compound (A), is preferably ≥0.1, more preferably ≥0.5, further more preferably ≥0.7, preferably ≤2.0, more preferably ≤1.5, and further more preferably ≤1.3 in terms of achieving satisfactory reaction activity.

The polymerization catalyst composition preferably further includes a halogen compound (D). Examples of the halogen compound (D) include a Lewis acid, a complex compound of a metal halide and a Lewis base, and an organic compound containing an active halogen. The halogen compound (D) is capable of being reacted with the aforementioned rare earth element compound (A), for example, to generate a cationic transition metal compound, a halide transition metal compound, or a compound of which transition metal center is deficient in charge.

Examples of the Lewis acid include a halogen compound containing a group 3, 4, 5, 6, 8, 13, 14, 15 element in the periodic table. Preferable examples of the halogen compound include an aluminum halide and an organic metal halide. Chlorine or bromine is preferable as the halogen element.

Specific examples of the Lewis acid include titanium tetrachloride, tungsten hexachloride, tris(pentafluorophenyl)borate, methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, aluminum tribromide, tris(pentafluorophenyl)aluminum, dibutyltin dichloride, tin tetrachloride, phosphorus trichloride, phosphorus pentachloride, antimony trichloride, antimony pentachloride, and the like. Ethylaluminum dichloride, ethylaluminum dibromide, diethylaluminum chloride, diethylaluminum bromide, ethylaluminum sesquichloride, ethylaluminum sesquibromide are particularly preferable as the Lewis acid among these examples.

Examples of the metal halide which, together with a Lewis base, constitutes a complex compound include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold iodide, gold bromide, and the like. Magnesium chloride, calcium chloride, barium chloride, manganese chloride, zinc chloride and copper chloride are preferable as the metal halide among these examples. Magnesium chloride, manganese chloride, zinc chloride and copper chloride are particularly preferable.

Further, preferable examples of the Lewis base constituting, together with the metal halide, a complex compound include a phosphorus compound, a carbonyl compound, a nitrogen compound, an ether compound, alcohol, and the like. Specifically, desirable examples of the Lewis base include tributyl phosphate, tris (2-ethylhexyl) phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, naphthenic acid, versatic acid, triethylamine, N,N-dimethylacetoamide, tetrahydrofuran, diphenyl ether, 2-ethyl-hexyl alcohol, oleyl alcohol, stearyl alcohol, phenol, benzyl alcohol, 1-decanol, lauryl alcohol, and the like. Tris (2-ethylhexyl) phosphate, tricresyl phosphate, acetylacetone, 2-ethyl-hexanoic acid, versatic acid, 2-ethyl-hexyl alcohol, 1-decanol, and lauryl alcohol are preferable as the Lewis base among these examples.

0.01 to 30 mol (preferably 0.5 to 10 mol) per 1 mol of the metal halide, of the aforementioned Lewis base, is reacted with the metal halide. Metals remaining in the copolymer can be reduced by using a reactant obtained by a reaction between the metal halide and the Lewis base carried out in such a manner as described above.

Examples of the organic compound containing active halogen, as the halogen compound (D), include benzyl chloride and the like.

Either a single type or combination of two or more types of the aforementioned examples may be used as the halogen compound (D).

A content of the halogen compound (D) in the polymerization catalyst composition is preferably ≥0 times, more preferably ≥0.5 times, particularly preferably ≥1.0 times, preferably ≤20 times, and more preferably ≤10 times, as much as a content of the rare earth element component (A) when compared in mol in terms of enhancing the catalytic activities.

The polymerization catalyst composition may further include aluminoxane (E). The aluminoxane is a compound obtained by bringing an organic aluminum compound into contact with a condensing agent Examples of the aluminoxane (E) include a chain aluminoxane or a cyclic aluminoxane having repeating units, represented by the following general formula:

(—Al(R')O—)

(In the general formula, R' represents a $C_{1-10}$ hydrocarbon group; some of the hydrocarbon groups may be substituted with halogen atom and/or alkoxy group; and polymerization degree of the repeating units is preferably ≥5 and more preferably ≥10). Specific examples of R' include methyl, ethyl, propyl, isobutyl groups and the like. Methyl group is preferable as R' among these examples. Examples of the organic aluminum compound used as a raw material of the aluminoxane (E) include trialkylaluminum such as trimethylaluminum, triethylaluminum, triisobutylaluminum, and a mixture thereof. Trimethylaluminum is particularly preferable among these examples as the organic aluminum compound. An aluminoxane obtained by using a mixture of trimethylaluminum and tributylaluminum as the raw material can be suitably used as the aluminoxane (E), for example.

Provided that "Al/M" represents an element ratio of the aluminum element (Al) of aluminoxane with respect to the element (M) constituting the rare earth element component (A), a content of the aluminoxane (E) in the polymerization catalyst composition is preferably set such that the element ratio Al/M is in the range of 10 to 1,000 approximately.

The polymerization catalyst composition preferably includes at least one solvent selected from an aromatic hydrocarbon solvent, an aliphatic hydrocarbon solvent and an alicyclic hydrocarbon solvent. Examples of the aromatic hydrocarbon solvent include toluene, xylene, and the like. Examples of the aliphatic hydrocarbon solvent include pentane, hexane, heptane, octane, and the like. Examples of the alicyclic hydrocarbon solvent include cyclopentane, cyclohexane, methylcyclopentane, cyclooctane, and the like. Either a single type or combination of two or more types of the aforementioned examples may be used as the solvent.

The polymerization catalyst composition may be prepared by mixing the aforementioned respective components in advance and then used for copolymerization or, alternatively, prepared in situ in a polymerization system for carrying out copolymerization. In this regard, the rare earth element compound (A) represented by general formula (I) may be prepared in situ in the polymerization system for carrying out copolymerization. For example, the rare earth element compound (A) represented by general formula (I) can be generated from a rare earth element compound (F) represented by the following general formula (III) and a cyclopentadiene skeleton-containing compound (G) having a group selected from a cyclopentadienyl group, an indenyl group and a fluorenyl group. A process of preparing the catalyst composition in advance can be omitted by synthesizing the rare earth element compound (A) in the polymerization system for carrying out copolymerization, as described above.

(III)

[In general formula (III), M represents scandium, yttrium or a lanthanoid element; each of X, X' and X" represents hydrogen atom halogen atom, alkoxy, thiolate, amide, silyl, or a $C_{1-20}$ hydrocarbon group; the $C_{1-20}$ hydrocarbon group may have a group containing silicon, oxygen, nitrogen, sulfur or phosphor at a terminal/between terminals thereof; X, X' and X" may be of either the same type or different types; "a" and "b" each independently represent an integer in the range of 0 to 3, wherein a+b≥1; L represents a neutral Lewis base; and "c" represents an integer in the range of 0 to 3.]

Either a single type or combination of two or more types of the aforementioned relevant compounds may be used as each of the rare earth element compound (F) and the cyclopentadiene skeleton-containing compound (G).

"M" in general formula (III) is defined in the same manner as "M" in general formula (I) described above, X and X' in general formula (III) are defined in the same manner as X and X' in general formula (I) described above, and "L" in general formula (III) is defined in the same manner as "L" in general formula (I) described above.

Further, X" in general formula (III) is defined in the same manner as X and X' in general formula (I) described above. The preferable examples of X and X' described above are also applicable to those of X".

The cyclopentadiene skeleton-containing compound (G) has a group selected from a cyclopentadienyl group, an indenyl group and a fluorenyl group. Specifically, the cyclopentadiene skeleton-containing compound (G) is at least one compound selected from the group consisting of a substituted/unsubstituted cyclopentadiene, a substituted/unsubstituted indene, and a substituted/unsubstituted fluorene. The cyclopentadiene skeleton-containing compound (G) is preferably a substituted cyclopentadiene, a substituted indene or a substituted fluorene, and more preferably a substituted indene, in particular. In such preferable cases, the polymerization catalyst is bulky enough in terms of advantageously increasing a steric hindrance effect thereof, thereby successfully shortening reaction time and raising the reaction temperature. Further, in such preferable cases, the polymerization catalyst has a large number of electrons in a conjugated system, thereby successfully further improving the catalytic activities in the reaction system.

Examples of a substituent group of the substituted cyclopentadiene compound, the substituted indene compound, and the substituted fluorene include a hydrocarbyl or a metalloid group. The number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. On the other hand, examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl group, and the like.

Examples of the substituted cyclopentadiene compound include pentamethylcyclopentadiene, tetramethylcyclopentadiene, isoproplylcyclopentadiene, trimethylsilyl-tetramethylcyclopentadiene, (1-benzyldimethylsilyl)cyclopenta[I] phenanthrene, and the like.

Examples of the substituted indene compound include 2-phenyl-1H-indene, 3-benzyl-1H-indene, 3-methyl-2-phenyl-1H-indene, 3-benzyl-2-phenyl-1H-indene, 1-benzyl-1H-indene, 1-methyl-3-dimethylbenzylsilyl-indene, 1,3-bis (t-butyldimethylsilyl) indene, (1-benzyldimethylsilyl-3-cyclopentyl)indene, (1-benzyl-3-t-butyldiemthylsilyl) indene, and the like. 3-benzyl-1H-indene and 1-benzyl-1H-indene are preferable in terms of making the molecular weight distribution as narrow as possible.

Examples of the substituted fluorene compound include trimethylsilylfluorene, isopropylfluorene, and the like.

The production method for a copolymer described above includes a process of copolymerizing ethylene, a $C_{4-10}$ non-conjugated olefin compound and a conjugated diene compound under the presence of the aforementioned polymerization catalyst composition (which process will occasionally be referred to as "the copolymerization process" hereinafter). The production method for a copolymer may further include, in addition to the copolymerization process, coupling process, rinsing process and other processes according to necessity.

Any polymerization method such as solution polymerization, suspension polymerization, liquid-phase bulk polymerization, emulsion polymerization, vapor-phase polymerization, or solid-phase polymerization can be used for the copolymerization process. In a case where a solvent is used in a relevant copolymerization reaction, any solvent is acceptable as long as the solvent is inactive in the copolymerization reaction. Examples of the solvent include toluene, hexane (e.g. cyclohexane, n-hexane), and the like.

In the production method for a copolymer, the copolymerization process may be carried out by either a single step or multiple (i.e. two or more) steps. The copolymerization process carried out by a single step represents a process of effecting copolymerization by bringing all monomers to be polymerized to simultaneous reactions. The copolymerization process carried out by multiple steps represents a process of effecting copolymerization by first bringing a portion/all of one/two or more monomer(s) to reactions, to form a polymer or a copolymer (the first polymerization step), and then adding the remaining portion(s) of the first polymerization step monomer(s) and the remaining type of monomer(s) which have not been used in the first polymerization step, to the polymer or copolymer thus formed, to complete copolymerization (the second polymerization step to the final polymerization step).

It is possible, under the presence of the polymerization catalyst composition, to control bond contents (cis-1,4 bond content, trans-1,4 bond content, 3,4 vinyl bond content, and 1,2 vinyl content) in the entire conjugated diene units of the copolymer thus manufactured and contents of the units derived from the respective monomers (that is, copolymerization ratios of the respective monomers) by controllably changing the charging order and charging amounts of the respective monomers when they are charged into a reaction vessel, and other reaction conditions.

Ethylene as one of the component monomers can be generally introduced to the polymerization system by pressing it into the system at a given pressure because ethylene is gas under normal temperature and pressure. The pressure at which ethylene is to be pressed into the polymerization system is not particularly restricted but preferably ≥0.05 MP, more preferably ≥0.1 MP, and preferably ≤2.5 MP, more preferably ≤2.0 MPa, in industrial terms.

A ratio (mole ratio) of a charging amount of the non-conjugated olefin compound with respect to an amount of the rare earth element compound (A) in the polymerization system is preferably ≥1,000, more preferably ≥3,000, further more preferably ≥5,000, and preferably ≤100,000, more preferably ≤70,000, further more preferably S 50,000, in terms of obtaining a desired content of the non-conjugated olefin in the copolymer.

A ratio (mole ratio) of a charging amount of the conjugated diene compound with respect to an amount of the rare earth element compound (A) in the polymerization system is preferably ≥100, more preferably ≥2,300, further more preferably ≥500, and preferably ≤70,000, more preferably ≤60,000, further more preferably ≤50,000, in terms of obtaining a desired content of the non-conjugated olefin in the copolymer.

The copolymerization process is preferably carried out in an atmosphere of inert gas, desirably in an atmosphere of nitrogen gas or argon gas. The temperature in the copolymerization process, although it is not particularly restricted, is preferably in the range of −100° C. to 200° C., and may be around the room temperature, for example. Too high reaction temperature may adversely affect selectivity of cis-1,4 bond of the conjugated diene unit of the copolymer. Pressure during the copolymerization process is preferably in the range of 0.1 MPa to 10.0 MPa in terms of capturing a sufficient amount of an acyclic non-conjugated olefin compound into the copolymerization reaction system. Reaction time of the copolymerization process is preferably in the range of 1 second to 10 days, for example, although it is not particularly restricted. The reaction time may be appropriately set depending on conditions such as a micro structure desired for the resulting copolymer, types of the respective monomers, charging amounts and charging order of the monomers, type of the catalyst, reaction temperature, and the like. The copolymerization reaction can be stopped by using a polymerization terminator such as methanol, ethanol, isopropanol in the copolymerization process.

The coupling process is a process of carrying out a reaction (a coupling reaction) for modifying at least a portion, e.g. a terminal end, of a polymer chain of the copolymer obtained by the copolymerization process described above. The coupling reaction is preferably carried out when a conversion ratio in the copolymerization reaction has reached 100%.

Type of a coupling agent for use in the coupling reaction is not particularly restricted and can be appropriately selected according to the purpose. Examples of the coupling agent include: (i) a tin-containing compound such as bis(maleic acid-1-octadecyl)dioctyl tin (IV), (ii) an isocyanate compound such as 4,4'-diphenylmethane diisocyanate; (iii) an alkoxysilane compound such as glycidyl propyltrimethoxysilane; and the like. Either a single type or combination of two or more types of these examples may be used as the coupling agent Bis(maleic acid-1-octadecyl)dioctyl tin (IV) is preferable as the coupling agent among these examples in terms of high reaction efficiency and relatively little gel generation.

The rinsing process is a process of rinsing a copolymer obtained by the aforementioned copolymerization process. Type of a solvent for use in the rinsing process is not particularly restricted and can be appropriately selected according to the purpose. Examples of the solvent include methanol, ethanol, isopropanol, and the like. An acid (such as hydrochloric acid, sulfuric acid, nitric acid) may be added to such a solvent as described above in the rinsing process when a Lewis acid-derived catalyst is used as the polymerization catalyst composition, in particular. An amount to be added, of the acid, is preferably 15 mol % or less with respect to the solvent Addition of the acid by an amount exceeding 15 mol % with respect to the solvent may cause the acid to remain in the copolymer, possibly adversely affecting mixture, kneading and a vulcanization reaction. An amount of catalyst residue in the copolymer can be decreased to an appropriate level by the rinsing process.

<Rubber Composition>

A rubber composition of the present disclosure characteristically includes the aforementioned copolymer. Accordingly, the rubber composition of the present disclosure is excellent in fracture resistance and ozone resistance.

The rubber composition of the present disclosure includes the aforementioned copolymer as a rubber component and optionally may further include other rubber components, a filler, a crosslinking agent and other components.

In the present disclosure, the aforementioned copolymer is regarded as a rubber component in a case where the rubber composition includes the copolymer. A content of the copolymer in the rubber component(s) in total is preferably ≥10 mass %.

Types of rubber components other than the copolymer of the present disclosure are not particularly restricted and can be appropriately selected according to the purpose. Examples of other rubber components include natural rubber (NR), polyisoprene rubber (IR), polybutadiene rubber (BR), acrylonitrile-butadiene rubber (NBR), chloroprene rubber, ethylene-propylene rubber (EPM), ethylene-propylene-non-conjugated diene rubber (EPDM), polysulfide rubber, silicone rubber, flurorubber, urethane rubber, and the like. Either a single type or combination of two or more types of these examples may be used as the other rubber components.

The rubber composition can improve reinforcing properties thereof by including a filler therein. Type of the filler is not particularly restricted and examples thereof include carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, barium sulfate, and the like. Carbon black is preferably used among these examples. Either a single type or combination of two or more types of these examples may be used as the filler.

A content of the filler, although it is not particularly restricted and appropriately selected according to the purpose, is preferably 10 to 100 parts by mass, more preferably 20 to 80 parts by mass, and most preferably 30 to 60 parts by mass, with respect to 100 parts by mass of the rubber component. The content of filler, of ≥10 parts by mass with respect to 100 parts by mass of the rubber component, ensures an effect of improving the reinforcing property of the rubber composition by the filler. The content of filler, of ≤100 parts by mass with respect to 100 parts by mass of the rubber component, ensures good workability of the rubber composition.

Type of the crosslinking agent is not particularly restricted and can be appropriately selected according to the purpose. Examples of the crosslinking agent include sulfur-based crosslinking agent, organic peroxide-based crosslinking agent, inorganic crosslinking agent, polyamine crosslinking agent, resin crosslinking agent, sulfur compound-based crosslinking agent, oxime-nitrosamine-based crosslinking agent, and the like. Sulfur-based crosslinking agent (sulfur-based vulcanizing agent) is preferably applied to a rubber composition for a tire among these examples.

A content of the crosslinking agent is not particularly restricted and can be appropriately selected according to the purpose but is preferably in the range of 0.1 to 20 parts by mass with respect to 100 parts by mass of the rubber component.

A vulcanization accelerator may be used in combination with the vulcanizing agent. Examples of the vulcanization accelerator include guanidine based, aldehyde-amine based, aldehyde-ammonium based, thiazole based, sulfenamide based, thiourea based, thiuram based, dithiocarbamate based, xanthate based compounds, and the like.

Further, other known additives such as a softener, a vulcanization accelerator aid, a coloring agent, a fire retardant, a lubricant, a foaming agent, a plasticizer, a processing aid, an antioxidant, an antiaging agent, a scorch protection agent, a UV protection agent, an antistatic agent, an anti-coloring agent, and the like may optionally be used in the rubber composition of the present disclosure according to the necessity.

The rubber composition of the present disclosure is applicable to, other than a tire described below, a rubber damper, quake-absorbing rubber, a belt such as a conveyor belt, a rubber crawler, hoses of various types, and the like.

<Resin Composition>

A resin composition of the present disclosure characteristically includes the aforementioned copolymer. Accordingly, the resin composition of the present disclosure is excellent in fracture resistance and ozone resistance.

The resin composition of the present disclosure includes the aforementioned copolymer as a resin component and optionally may further include other resin components and additives of various types.

In the present disclosure, the aforementioned copolymer is regarded as a resin component in a case where the resin composition includes the copolymer. A content of the copolymer in the resin component(s) in total is preferably ≥10 mass %.

Examples of resin components other than the copolymer of the present disclosure include: a thermoplastic resin such as polyethylene, polypropylene, polystyrene, polyvinyl chloride, polyamide, polycarbonate, polyoxymethylene, polyphenylene ether, and the like; and a thermosetting resin such as phenol resin, epoxy resin, urea resin, melamine resin, and the like.

Examples of the additives include an antistatic agent, a lubricant, a crystal nucleating agent, a tackifier, an antifogging agent, a mold-releasing agent, a plasticizer, a filler, a pigment, a dye, a flavoring agent, a fire retardant, and the like.

<Tire>

A tire of the present disclosure characteristically employs the aforementioned rubber composition. Accordingly, the tire of the present disclosure is excellent in fracture resistance and ozone resistance.

A portion of a tire to which the rubber composition of the present disclosure is to be applied is not particularly limited and the tire portion can be appropriately selected according to the purpose. Examples of the tire portion include a tread, a base tread, a sidewall, side reinforcing rubber, a bead filler, and the like.

The tire of the present disclosure can be manufactured by a conventional method. For example, a desired tire such as a pneumatic tire can be manufactured by: sequentially laminating members generally for use in tire production such as a carcass layer, a belt layer, a tread layer made of the unvulcanized rubber composition and/or cords on a tire building drum; removing the drum, to obtain a green tire; and subjecting the green tire to heating and vulcanization according to the conventional method.

<Resin Product>

A resin product of the present disclosure characteristically employs the aforementioned resin composition. Accordingly, the resin product of the present disclosure is excellent in fracture resistance and ozone resistance.

Applications of the resin product of the present disclosure are not particularly restricted. The resin product of the present disclosure is applicable to various articles wherein at least a portion of each article is made of a resin.

EXAMPLES

The present disclosure will be described further in detail by Examples hereinafter. The present disclosure is not restricted by any means by these Examples.

(Synthesis Method of Complex A)

Complex A was synthesized by: adding dropwise a toluene solution (10 ml) of 1,3-(tBuMe$_2$Si)$_2$C$_9$H$_6$ (0.152 g, 0.441 mmol) to a toluene solution (10 ml) of Sc(CH$_2$SiMe$_3$)$_3$ (THF) (0.260 g, 0.577 mmol) over 10 minutes at the room temperature in a glovebox under nitrogen atmosphere; stirring the mixture solution for 2 hours; then drying the solution under reduced pressure; adding toluene (20 ml) to the residue and stirring the mixture, to remove the substances with low boiling points (THF, toluene, Me$_4$Si) therefrom under reduced pressure; repeating the steps of drying the solution and removing the substances with low boiling points described above under reduced pressure until the complete conversion of 1,3-(tBuMe$_2$Si)$_2$C$_9$H$_6$ and Sc(CH$_2$SiMe$_3$)$_3$(THF) was confirmed by 1H-NMR measurement; adding toluene to the crude product thus obtained and then filtering insoluble substances from the mixture solution; condensing the solution thus filtrated and cooling the condensate to −30° C., thereby obtaining as colorless crystal 1,3-bis(t-butyldimethylsilyl)indenyl[bis(trimethylsilyl)methyl]scandium complex {[1,3-(tBuMe$_2$Si)$_2$C$_9$H$_5$]Sc(CH$_2$SiMe$_3$)$_2$(THF)} represented by the following structural formula (yield: 0.200 g (71.4%)).

Figure 1:
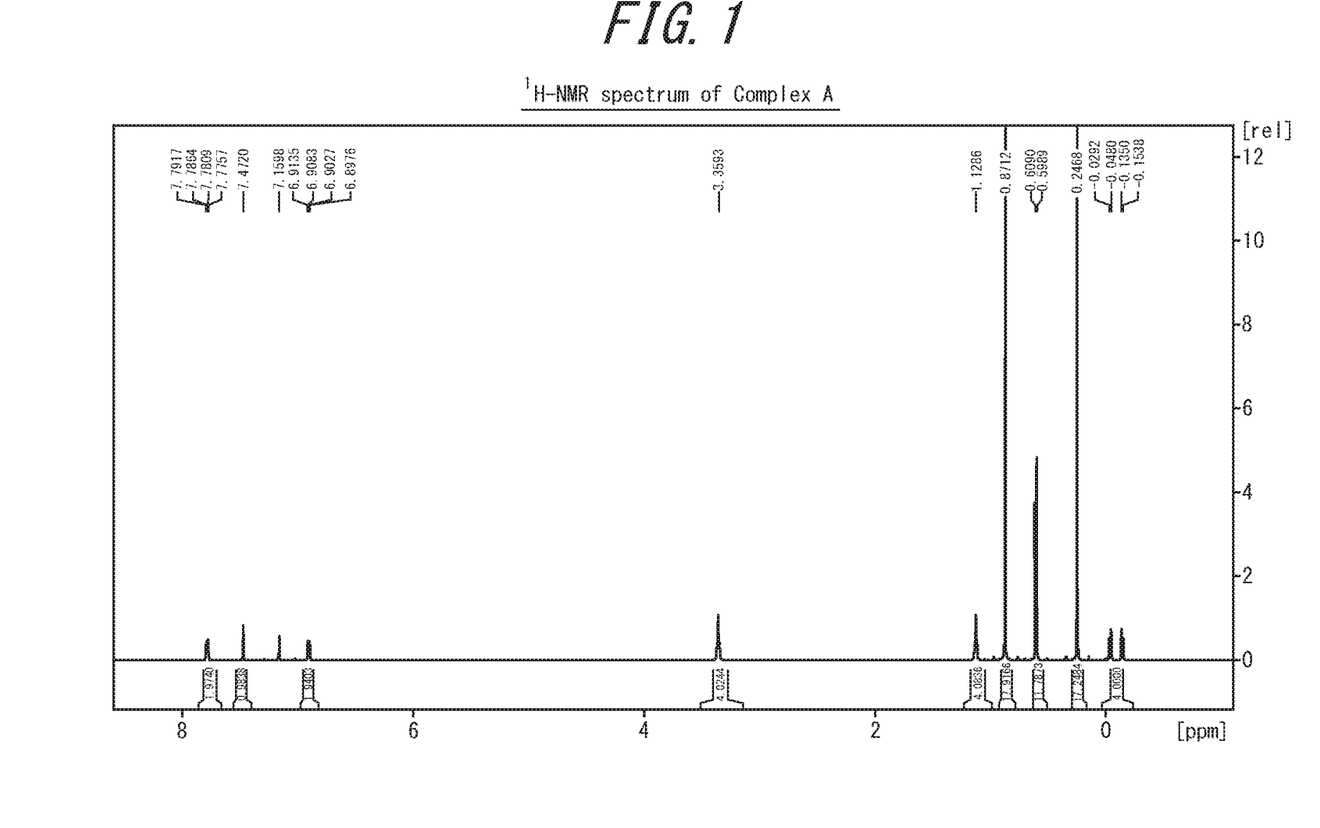
FIG. 1 shows $^1$H-NMR spectrum of Complex A.

The $^1$H-NMR spectrum of Complex A thus obtained is shown in FIG. 1. The identification results obtained from the $^1$H-NMR spectrum are as follows. $^1$H-NMR (C$_6$D$_6$, δ/ppm): 7.79 (d, 2H, aromatic), 7.47 (s, 1H, aromatic), 6.90 (d, 2H, aromatic), 3.36 (br, 4H, THF), 1.13 (br, 4H, THF), 0.87 (s, 18H, tBuSi×2), 0.60 (d, 12H, Me2Si×2), 0.25 (d, 12H, Me3Si×3), −0.091 (dd, 4H, CH2×2).

(Synthesis Method of Complex B)

Complex B was synthesized by carrying out the same steps of the synthesis method of Complex A described above, except that 1,3-(tBuMe$_2$Si)$_2$C$_9$H$_6$ of the synthesis method of Complex A was replaced with (1-C$_6$H$_5$CH$_2$Me$_2$Si-3-C$_5$H$_9$)C$_9$H$_6$ (0.147 g, 0.442 mmol), thereby obtaining as an oily orange-colored residue (1-benzyldimethylsilyl-3-cyclopentane)indenyl[bis(trimethylsilyl)methyl]scandium complex {[(1-C$_6$H$_5$CH$_2$Me$_2$Si-3-C$_5$H$_9$)C$_9$H$_5$]Sc[(CH$_2$SiMe$_3$)$_2$](THF)} represented by the following structural formula (yield: 0.243 g (88%)).

(Synthesis Method of Complex C)

Complex C was synthesized by carrying out the same steps of the synthesis method of Complex A described above, except that 1,3-(tBuMe$_2$Si)$_2$C$_9$H$_6$ of the synthesis method of Complex A was replaced with [(1-C$_6$H$_5$CH$_2$-3-tBuMe$_2$Si)CH$_6$] (0.142 g, 0.443 mmol), thereby (substantially quantitatively) obtaining as an oily dark orange-colored residue (1-benzyl-3-t-butyldimethylsilyl)indenyl[bis(trimethylsilyl)methyl]scandium complex {[(1-C$_6$H$_5$CH$_2$-3-tBuMe$_2$Si)C$_9$H$_5$]Sc[(CH$_2$SiMe$_3$)$_2$](THF)} represented by the following structural formula (yield: 0.264 g (89%)).

(Synthesis Method of Complex D)

Complex D was synthesized by carrying out the same steps of the synthesis method of Complex A described above, except that 1,3-(tBuMe$_2$Si)$_2$C$_9$H of the synthesis method of Complex A was replaced with [1-(C$_6$H$_5$CH$_2$Me$_2$Si)C$_{17}$H$_{11}$] (0.162 g, 0.443 mmol), thereby (substantially quantitatively) obtaining as an oily dark orange-colored residue (1-benzyldimethylsilyl)cyclopenta[I]phenanthrene[bis(trimethylsilyl)methyl]scandium complex {[1-(C$_6$H$_5$CH$_2$Me$_2$Si)C$_{17}$H$_{10}$]Sc[(CH$_2$SiMe$_3$)$_2$](THF)} represented by the following structural formula (yield: 0.264 g (91%)).

Example 1

Example 1 was carried out by: mixing Complex D (19.7 mg, 0.03 mmol), trityl tetrakis(pentafluorophenyl)borate [Ph$_3$CB(C$_6$F$_5$)$_4$] (27.6 mg, 0.03 mmol) and 0.50 mmol of triisobutylaluminum and adding 20 mL of toluene thereto in a glovebox under nitrogen atmosphere, thereby preparing a catalyst solution;

charging 50.0 g (0.59 mol) of 1-hexene and 250 g of toluene into a thoroughly dried pressure-resistant stainless reactor (2,000 mL);

charging the catalyst solution prepared as described above into the pressure-resistant stainless reactor and heating the mixture therein to 40° C.; then introducing 80 g of a monomer solution containing 20 g of isoprene (0.29 mol) to the reactor, thereby conducting polymerization under pressurized ethylene atmosphere (0.22 MPa) for 110 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor, and isolating a resulting copolymer by using a large amount of methanol and vacuum-drying the copolymer at 50° C., thereby obtaining a terpolymer.

The yield of the terpolymer thus obtained was 70 g.

Example 2

Example 2 was carried out by: mixing Complex B (18.7 mg, 0.03 mmol), trityl tetrakis(pentafluorophenyl)borate [Ph$_3$CB(C$_6$F$_5$)$_4$] (27.6 mg, 0.03 mmol) and 0.35 mmol of triisobutylaluminum and adding 20 mL of toluene thereto in a glovebox under nitrogen atmosphere, thereby preparing a catalyst solution;

charging 50.0 g (0.59 mol) of 1-hexene and 250 g of toluene into a thoroughly dried pressure-resistant stainless reactor (2,000 mL);

charging the catalyst solution prepared as described above into the pressure-resistant stainless reactor and heating the mixture therein to 40° C.; then introducing 69 g of a monomer solution containing 17 g of isoprene (0.249 mol) to the reactor, thereby conducting polymerization under pressurized ethylene atmosphere (0.22 MPa) for 155 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor, and isolating a resulting copolymer by using a large amount of methanol and vacuum-drying the copolymer at 50° C., thereby obtaining a terpolymer.

The yield of the terpolymer thus obtained was 63 g.

Example 3

Example 3 was carried out by: mixing Complex A (18.7 mg, 0.03 mmol), trityl tetrakis(pentafluorophenyl)borate [Ph$_3$CB(C$_6$F$_5$)$_4$] (27.6 mg, 0.03 mmol) and 0.50 mmol of triisobutylaluminum and adding 20 mL of toluene thereto in a glovebox under nitrogen atmosphere, thereby preparing a catalyst solution;

charging 50 g (0.59 mol) of 1-hexene and 250 g of toluene into a thoroughly dried pressure-resistant stainless reactor (2,000 mL);

charging the catalyst solution prepared as described above into the pressure-resistant stainless reactor and heating the mixture therein to 40° C.; then introducing 69 g of a monomer solution containing 17 g of isoprene (0.249 mol) to the reactor, thereby conducting polymerization under pressurized ethylene atmosphere (0.15 MPa) for 60 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor, and isolating a resulting copolymer by using a large amount of methanol and vacuum-drying the copolymer at 50° C., thereby obtaining a terpolymer.

The yield of the terpolymer thus obtained was 50 g.

Example 4

Example 4 was carried out by: mixing Complex C (18.3 mg, 0.03 mmol), trityl tetrakis(pentafluorophenyl)borate [$Ph_3CB(C_6F_5)_4$] (27.6 mg, 0.03 mmol) and 0.50 mmol of triisobutylaluminum and adding 20 mL of toluene thereto in a glovebox under nitrogen atmosphere, thereby preparing a catalyst solution;

charging 50 g (0.59 mol) of 1-hexene and 250 g of toluene into a thoroughly dried pressure-resistant stainless reactor (2,000 mL);

charging the catalyst solution prepared as described above into the pressure-resistant stainless reactor and heating the mixture therein to 40° C.; then introducing 110 g of a monomer solution containing 28 g of isoprene (0.41 mol) to the reactor, thereby conducting polymerization under pressurized ethylene atmosphere (0.15 MPa) for 110 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor; and isolating a resulting copolymer by using a large amount of methanol and vacuum-drying the copolymer at 50° C., thereby obtaining a terpolymer.

The yield of the terpolymer thus obtained was 48 g.

Example 5

Example 5 was carried out by: mixing Complex C (18.3 mg, 0.03 mmol), trityl tetrakis(pentafluorophenyl)borate [$Ph_3CB(C_6F_5)_4$] (27.6 mg, 0.03 mmol) and 0.50 mmol of triisobutylaluminum and adding 20 mL of toluene thereto in a glovebox under nitrogen atmosphere, thereby preparing a catalyst solution;

charging 33 g (0.39 mol) of 1-hexene and 270 g of toluene into a thoroughly dried pressure-resistant stainless reactor (2,000 mL);

charging the catalyst solution prepared as described above into the pressure-resistant stainless reactor and heating the mixture therein to 40° C.; then introducing 60 g of a monomer solution containing 15 g of isoprene (0.22 mol) to the reactor, thereby conducting polymerization under pressurized ethylene atmosphere (0.15 MPa) for 60 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor, and isolating a resulting copolymer by using a large amount of methanol and vacuum-drying the copolymer at 50° C., thereby obtaining a terpolymer.

The yield of the terpolymer thus obtained was 40 g.

Example 6

Example 6 was carried out by: mixing Complex C (18.3 mg, 0.03 mmol), trityl tetrakis(pentafluorophenyl)borate [$Ph_3CB(C_6F_5)_4$] (27.6 mg, 0.03 mmol) and 0.50 mmol of triisobutylaluminum and adding 20 mL of toluene thereto in a glovebox under nitrogen atmosphere, thereby preparing a catalyst solution;

charging 40 g (0.36 mol) of 1-octene and 340 g of toluene into a thoroughly dried pressure-resistant stainless reactor (2,000 mL);

charging the catalyst solution prepared as described above into the pressure-resistant stainless reactor and heating the mixture therein to 40° C.; then introducing 78 g of a monomer solution containing 19.5 g of isoprene (0.29 mol) to the reactor, thereby conducting polymerization under pressurized ethylene atmosphere (0.15 MPa) for 120 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor; and isolating a resulting copolymer by using a large amount of methanol and vacuum-drying the copolymer at 50° C., thereby obtaining a terpolymer.

The yield of the terpolymer thus obtained was 65 g.

Example 7

Example 7 was carried out by: mixing Complex C (18.3 mg, 0.03 mmol), trityl tetrakis(pentafluorophenyl)borate [$Ph_3CB(C_6F_5)_4$] (27.6 mg, 0.03 mmol) and 0.50 mmol of triisobutylaluminum and adding 20 mL of toluene thereto in a glovebox under nitrogen atmosphere, thereby preparing a catalyst solution;

charging 40 g (0.36 mol) of 1-octene and 340 g of toluene into a thoroughly dried pressure-resistant stainless reactor (2,000 mL);

charging the catalyst solution prepared as described above into the pressure-resistant stainless reactor and heating the mixture therein to 40° C.; then introducing 224 g of a monomer solution containing 56 g of isoprene (0.82 mol) to the reactor, thereby conducting polymerization under pressurized ethylene atmosphere (0.30 MPa) for 120 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor, and isolating a resulting copolymer by using a large amount of methanol and vacuum-drying the copolymer at 50° C., thereby obtaining a terpolymer.

The yield of the terpolymer thus obtained was 70 g.

Comparative Example 1

Comparative Example 1 was carried out by: mixing Complex D (33.0 mg, 0.05 mmol), trityl tetrakis(pentafluorophenyl)borate [$Ph_3CB(C_6F_5)_4$] (51.0 mg, 0.055 mmol) and 1.0 mmol of triisobutylaluminum hydride and adding 20 mL of toluene thereto in a glovebox under nitrogen atmosphere, thereby preparing a catalyst solution;

dissolving 60 g (1.43 mol) of propylene by adding 300 g of toluene thereto in a thoroughly dried pressure-resistant stainless reactor (2,000 mL);

charging the catalyst solution prepared as described above into the pressure-resistant stainless reactor and heating the mixture therein to 40° C.; then introducing 21 g of a monomer solution containing 5.3 g of isoprene (0.08 mol) to the reactor, thereby conducting polymerization under pressurized ethylene atmosphere (0.22 MPa) for 40 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor, and isolating a resulting copolymer by using a large amount of methanol and vacuum-drying the copolymer at 50° C., thereby obtaining a terpolymer.

The yield of the terpolymer thus obtained was 38 g.

Comparative Example 2

Comparative Example 2 is carried out by: mixing Complex E{(2-phenylindene)gadolinium bis(dimethylsilyl)amide [(2-PhC$_9$H$_6$)$_2$GdN(SiHMe$_2$)$_2$]} (33.6 mg, 0.05 mmol), trityl tetrakis(pentafluorophenyl)borate [Ph$_3$CB(C$_6$F$_5$)$_4$] (46.0 mg, 0.03 mmol) and 0.50 mmol of triisobutylaluminum and adding 20 mL of toluene thereto in a glovebox under nitrogen atmosphere, thereby preparing a catalyst solution:

charging 99.0 g (1.18 mol) of 1-hexene and 200 g of toluene into a thoroughly dried pressure-resistant stainless reactor (2,000 mL);

charging the catalyst solution prepared as described above into the pressure-resistant stainless reactor and heating the mixture therein to 40° C.; then introducing 80 g of a monomer solution containing 20 g of isoprene (0.29 mol) to the reactor, thereby conducting polymerization under pressurized ethylene atmosphere (0.22 MPa) for 90 minutes;

then stopping the copolymerization reaction by adding 1 mL of an isopropanol solution of 5 mass % 2,2-methylene-bis(4-ethyl-6-t-butylphenol) (NS-5) to the pressure-resistant stainless reactor, and isolating a resulting copolymer by using a large amount of methanol and vacuum-drying the copolymer at 50° C., thereby obtaining a terpolymer.

The yield of the terpolymer thus obtained is 45 g.

For each of the copolymers obtained as described above, (1) respective contents of isoprene unit, ethylene unit, propylene unit, 1-hexene unit or 1-octene unit, and a content of 1.4 bonding isoprene unit in the isoprene unit and a content of 3,4 bonding isoprene unit (3,4 vinyl bond content) in the isoprene unit; (2) the average molecular weight; (3) the melting point (Tm); (4) degree of crystallinity; and (5) the main chain structure were measured/analyzed by the methods described below. The results are shown in Table 1.

(1) Respective contents of isoprene unit, ethylene unit, propylene unit, 1-hexene unit or 1-octene unit, and a content of 1,4-bonding isoprene unit in the isoprene unit and a content of 3,4-bonding isoprene unit (3,4-vinyl bond content) in the isoprene unit Respective contents (mol %) of isoprene unit, ethylene unit, propylene unit, 1-hexene unit or 1-octene unit, and a content (mol %) of 1,4-bonding isoprene unit in the isoprene unit and a content (mol %) of 3,4-bonding isoprene unit (3,4-vinyl bond content in mol %) in the isoprene unit of each of the copolymers were calculated based on the integration ratios of the respective peaks in the $^1$H-NMR (373K, C$_2$D$_4$Cl$_2$ solvent) spectrum thereof according to the calculation formulae described below.

Respective contents (wt %) of isoprene unit, ethylene unit, propylene unit, 1-hexene unit or 1-octene unit were also obtained by converting the contents (mol %) of the units into the contents (wt %).

Figure 2:
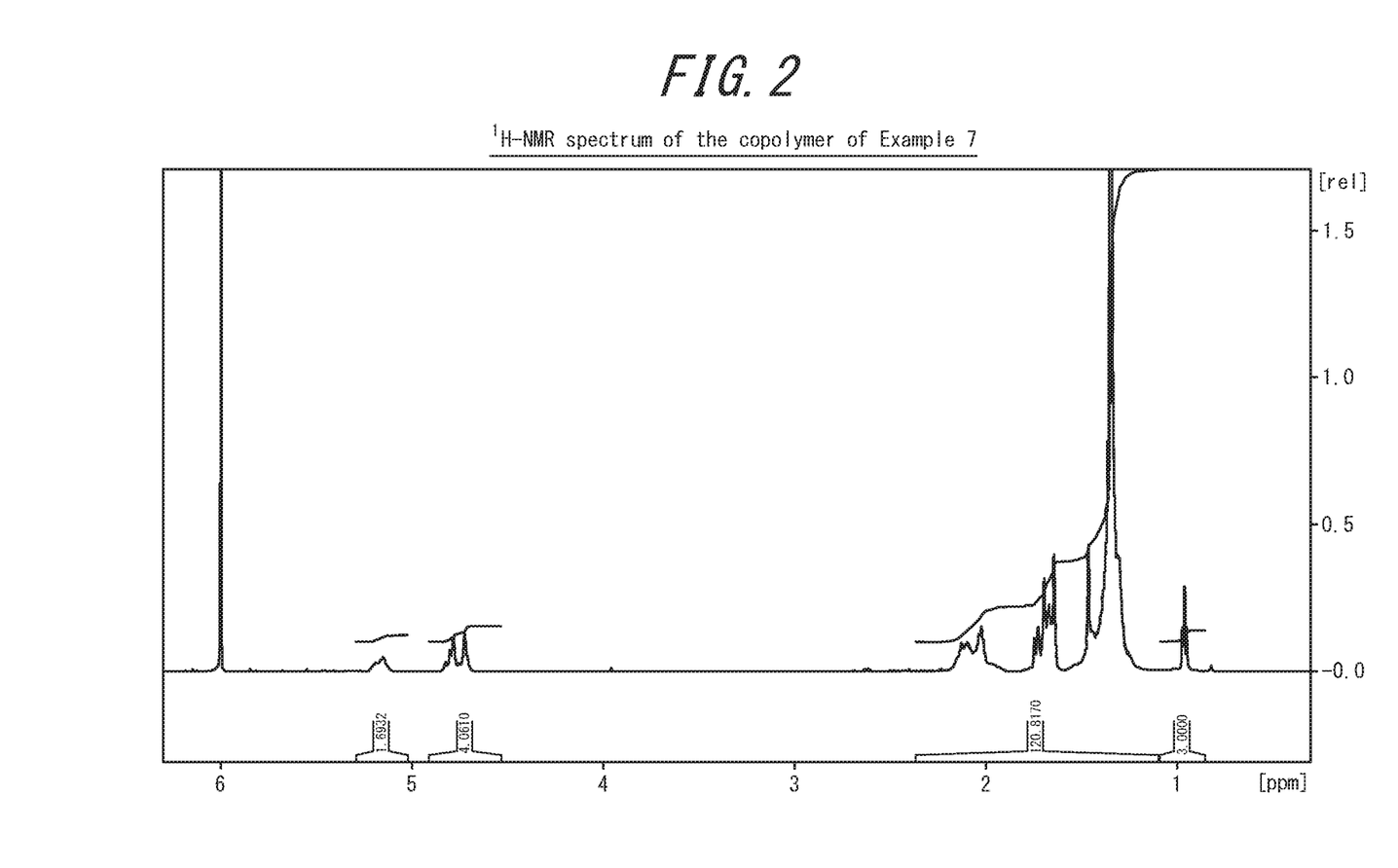
FIG. 2 shows $^1$H-NMR spectrum of the copolymer of Example 7.

The 1H-NMR spectrum of the copolymer of Example 7 is shown FIG. 2 as a reference example.

In the calculation formulae shown below, I1 represents a peak integral value in the range of 4.90-5.20 ppm (derived from the 1,4-bonding isoprene unit);

I2 represents a peak integral value in the range of 4.50-4.90 ppm (derived from the 3,4-vinyl bonding isoprene unit);

I3 represents a peak integral value in the range of 0.80-2.40 ppm; and

I4 represents a peak integral value in the range of 0.80-1.1 ppm (derived from olefin methyl).

Incidentally, it was confirmed from the 1H-NMR spectra of the copolymers that a 1,2-vinyl bond content in the isoprene unit is 0 mol % in each of the copolymers.

(1-i) Propylene Unit-Containing Copolymer System

A content of isoprene unit in the copolymer (mol %)= (I2×I1+6×I2)/(3×I3−9×I1−3×I2−2×I4)×100

A content of 1,4-bonding isoprene unit in the isoprene unit (mol %)=(2×I1)/(2×I1+I2)×100

A content of 3,4-bonding isoprene unit in the isoprene unit (mol %)=100−the content of 1,4-bonding isoprene unit in the isoprene unit (mol %)

A content of propylene unit in the copolymer (mol %)= (4×I4)/(3×I3−9×I1−3×I2−2×I4)×100

A content of ethylene unit in the copolymer (mol %)=100−the content of isoprene unit (mol %)−the content of propylene unit (mol %)

(1-ii) 1-Hexene Unit-Containing Copolymer System

A content of isoprene unit in the copolymer (mol %)= (12×I1+6×I2)/(3×I3−9×I1−3×I2−8×I4)×100

A content of 1,4-bonding isoprene unit in the isoprene unit (mol %)=(2×I1)/(2×I1+I2)×100

A content of 3,4-bonding isoprene unit in the isoprene unit (mol %)=100−the content of 1,4-bonding isoprene unit in the isoprene unit (mol %)

A content of 1-hexene unit in the copolymer (mol %)= (4×I4)/(3×I3−9×I1−3×I2−8×I4)×100

A content of ethylene unit in the copolymer (mol %)=100−the content of isoprene unit (mol %)−the content of 1-hexene unit (mol %)

(1-iii) 1-Octene Unit-Containing Copolymer System

A content of isoprene unit in the copolymer (mol %)= (12×I1+6×I2)/(3×I3−I9×I1−3×I2−I2×I4)×100

A content of 1,4-bonding isoprene unit in the isoprene unit (mol %)=(2×I1)/(2×I1+I2)×100

A content of 3,4-bonding isoprene unit in the isoprene unit (mol %)=100−the content of 1,4-bonding isoprene unit in the isoprene unit (mol %)

A content of 1-octene unit in the copolymer (mol %)= (4×I4)/(3×I3−9×I1−3×I2−I2×I4)×100

A content of ethylene unit in the copolymer (mol %)=100−the content of isoprene unit (mol %−the content of 1-octene unit (mol %)

(2) Average Molecular Weight

The number average molecular weight (Mn), the weight average molecular weight (Mw), and the molecular weight distribution (Mw/Mn) in terms of polystyrene standard were determined for each of the copolymers, relative to monodisperse polystyrene as a standard reference material, by using gel permeation chromatography [GPC: HLC-8220GPC/HT manufactured by Tosoh Corporation, column: GMH$_{HR}$-H(S) HT×2 manufactured by Tosoh Corporation, detector: a differential refractive index detector (RI)]. The measurement temperature was 40° C.

(3) Melting Point (Tm)

The melting point (Tm) of each of the copolymers was measured according to JIS K 7121-1987 by using a differential scanning calorimeter (DSC) "DSCQ2000" manufactured by TA Instruments Japan. The lower melting point (Tm) indicates the lower degree of crystallinity and the better workability of the copolymer.

Figure 3:
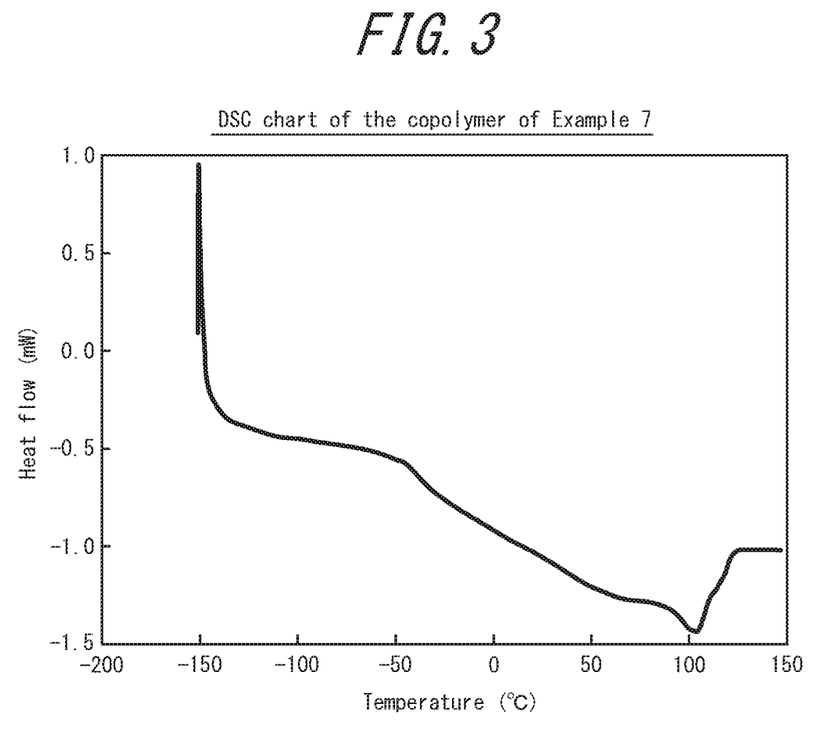
FIG. 3 shows a DSC chart of the copolymer of Example 7.

The DSC chart of the copolymer of Example 7 is shown FIG. 3 as a reference example.

(4) Degree of Crystallinity

A crystal melting energy of polyethylene having a crystal component ratio: 100% and a melting peak energy of each of the copolymers thus obtained were measured, so that a degree of crystallinity of the copolymer was calculated from a ratio of the melting peak energy of the copolymer with respect to the crystal melting energy of polyethylene. The melting peak energy was measured by DSC.

(5) Confirmation of Main Chain Structures of the Copolymers Thus Synthesized $^{13}$C-NMR spectrum was measured for each of the copolymers thus synthesized. Hexachlorobutadiene was used as a solvent in the measurement. None of the copolymers exhibited a peak derived from carbons of three-membered, four-membered, and live-membered alicyclic structures (10-24 ppm) in the $^{13}$C-NMR spectrum thereof. Accordingly, it was confirmed that each of the copolymers has the main chain constituted of only acyclic structures.

<Preparation and Evaluation of Rubber Compositions>

A rubber composition was prepared according to the formulation shown in Table 2 by using each of the copolymers obtained as described above. The rubber composition was subjected to vulcanization at 160° C. for 20 minutes, whereby a vulcanized rubber sample was obtained. Then, (6) fracture resistance, (7) ozone resistance and (8) wear resistance were evaluated, respectively, for the vulcanized rubber sample by the methods described below. The results are shown in Table 1.

(6) Fracture Resistance

Strength at break at the room temperature was measured, for the vulcanized rubber sample thus obtained, by a tensile test according to JIS K6251. The strength at break thus measured was expressed by an index value relative to the strength at break of Comparative Example 2 being "100". The larger index value represents the higher fracture resistance.

(7) Ozone Resistance

Ozone resistance is measured for the vulcanized rubber sample thus obtained according to JIS K6259. A strip-shaped test piece of the vulcanized rubber sample is exposed to ozone under the conditions of ozone concentration: 50 pphm and temperature: 40° C., while the test piece is imparted with 30% dynamic elongation(s), and the state of the test piece after 24 hour exposure, i.e. presence/absence of cracks therein, is visually determined. The evaluation criteria are as follows.

○: No cracks
Δ: Small crack/cracks is/are observed
x: Large crack/cracks is/are observed in the entire part of the test piece (8) Wear Resistance Wear resistance at the room temperature at a slip ratio: 60% was measured for the vulcanized rubber sample by using a Lambourn abrasion tester. The wear resistance value thus measured was converted to an inverse, so that the inverse was expressed by an index relative to the inverse of the wear resistance value of Comparative Example 2 being "100". The larger index value represents the higher wear resistance.

TABLE 1

|  |  |  | Example 1 | Example 2 | Example 3 | Example 4 | Example 5 |
|---|---|---|---|---|---|---|---|
| Raw material | Ethylene | — | Ethylene | Ethylene | Ethylene | Ethylene | Ethylene |
|  | $C_{3-10}$ Non-conjugated olefin | — | 1-Hexene | 1-Hexene | 1-Hexene | 1-Hexene | 1-Hexene |
|  | Conjugated diene | — | Isoprene | Isoprene | Isoprene | Isoprene | Isoprene |
| Catalyst |  | — | Complex D | Complex B | Complex A | Complex C | Complex C |
| Reaction conditions | Pressure of ethylene atmosphere | Mpa | 0.22 | 0.22 | 0.15 | 0.15 | 0.15 |
|  | Polymerization time | Minutes | 110 | 155 | 60 | 110 | 60 |
| Yield of product |  | g | 70 | 63 | 50 | 48 | 40 |
| Contents of respective bond type in conjugated diene unit | Content of 1,4-bonding isoprene unit in isoprene unit | mol % | 64.3 | 62.6 | 56.1 | 41.5 | 46.3 |
|  | Content of 3,4-bonding isoprene unit (3,4-vinyl bond content) in isoprene unit | mol % | 35.7 | 37.4 | 43.9 | 58.5 | 53.7 |
| Contents of respective monomer units in copolymer | Content of ethylene unit in copolymer | mol % | 83.5 | 92.5 | 82.4 | 78.7 | 83.3 |
|  |  | wt % | 65.2 | 81.8 | 61.5 | 58.1 | 65.4 |
|  | Content of $C_{3-10}$ non-conjugated olefin unit in copolymer | mol % | 8.2 | 4.1 | 15.5 | 8.4 | 6.5 |
|  |  | wt % | 19.3 | 10.8 | 34.7 | 18.7 | 15.3 |
|  | Content of isoprene unit in copolymer | mol % | 8.3 | 3.4 | 2.1 | 12.9 | 10.2 |
|  |  | wt % | 15.5 | 7.3 | 3.8 | 23.1 | 19.4 |
|  | Content of 3,4-bonding isoprene unit in copolymer | wt % | 5.5 | 2.7 | 1.7 | 13.5 | 10.4 |
| Physical properties of generated copolymer | Number average molecular weight (Mn) (×10$^3$) | — | 39 | 45 | 9.5 | 45 | 56 |
|  | Weight average molecular weight (Mw) (×10$^3$) | — | 116 | 129 | 46 | 179 | 146 |
|  | Molecular weight distribution (Mw/Mn) | — | 3.33 | 2.85 | 4.85 | 3.9 | 2.6 |
|  | Melting point (Tm) | ° C. | 104.8 | 109.1 | 83.3 | 56.6 | 82.9 |
|  | Degree of crystallinity | % | 18.7 | 36.5 | 10.3 | 8.7 | 16.3 |
| Evaluation results | Fracture resistance | Index | 102 | 102 | 101 | 104 | 104 |
|  | Ozone resistance | — | ○ | ○ | Δ | ○ | ○ |
|  | Wear resistance | Index | 102 | 105 | 102 | 103 | 102 |

TABLE 1-continued

|  |  |  | Example 6 | Example 7 | Comp. Example 1 | Comp. Example 2 |
|---|---|---|---|---|---|---|
| Raw material | Ethylene | — | Ethylene | Ethylene | Ethylene | Ethylene |
|  | $C_{3-10}$ Non-conjugated olefin |  | 1-Octene | 1-Octene | Propylene | 1-Hexene |
|  | Conjugated diene | — | Isoprene | Isoprene | Isoprene | Isoprene |
| Catalyst |  | — | Complex C | Complex C | Complex D | Complex E |
| Reaction conditions | Pressure of ethylene atmosphere | Mpa | 0.15 | 0.30 | 0.22 | 0.22 |
|  | Polymerization time | Minutes | 120 | 120 | 40 | 90 |
| Yield of product |  | g | 65 | 70 | 38 | 45 |
| Contents of respective bond type in conjugated diene unit | Content of 1,4-bonding isoprene unit in isoprene unit | mol % | 49.2 | 45.5 | 61.4 | 84.5 |
|  | Content of 3,4-bonding isoprene unit (3,4-vinyl bond content) in isoprene unit | mol % | 50.8 | 54.5 | 38.6 | 15.5 |
| Contents of respective monomer units in copolymer | Content of ethylene unit in copolymer | mol % | 87.4 | 81.6 | 79.6 | 83.6 |
|  |  | wt % | 66.9 | 61.6 | 65.8 | 66.8 |
|  | Content of $C_{3-10}$ non-conjugated olefin unit in copolymer | mol % | 8.1 | 3.9 | 15.3 | 3 |
|  |  | wt % | 24.9 | 11.8 | 27.5 | 7.2 |
|  | Content of isoprene unit in copolymer | mol % | 4.4 | 14.5 | 5.1 | 13.4 |
|  |  | wt % | 8.3 | 26.6 | 6.7 | 26 |
|  | Content of 3,4-bonding isoprene unit in copolymer | wt % | 4.2 | 14.5 | 2.6 | 4.0 |
| Physical properties of generated copolymer | Number average molecular weight (Mn) (×10³) | — | 31 | 87 | 10 | 15 |
|  | Weight average molecular weight (Mw) (×10³) | — | 107 | 344 | 23 | 57 |
|  | Molecular weight distribution (Mw/Mn) | — | 3.37 | 3.94 | 2.5 | 3.8 |
|  | Melting point (Tm) | °C. | 71.6 | 102.9 | 87 | 119.2 |
|  | Degree of crystallinity | % | 20.1 | 18.9 | 1.6 | 45.4 |
| Evaluation results | Fracture resistance | Index | 102 | 107 | 95 | 100 |
|  | Ozone resistance | — | ○ | Δ | Δ | X |
|  | Wear resistance | Index | 104 | 105 | 94 | 100 |

TABLE 2

|  | Parts by mass |
|---|---|
| Copolymer | 100 |
| Stearic acid | 2 |
| Carbon black (FEF grade) | 50 |
| Antioxidant *1 | 1 |
| Zinc white | 3 |
| Vulcanization accelerator 1 *2 | 0.4 |
| Vulcanization accelerator 2 *3 | 0.2 |
| Sulfur | 1.4 |

*1 Antioxidant: N-(1,3-dimethylbutyl)-N'-p-phenylenediamine, "Nocrac 6C" manufactured by Ouchi-Shinko Chemical Industrial Co., Ltd.
*2 Vulcanization accelerator 1: N-cyclohexyl-2-benzothiazolylsulfenamide, "Nocceler CZ-G" manufactured by Ouchi-Shinko Chemical Industrial Co., Ltd.
*3 Vulcanization accelerator 2: Dibenzothiazyl disulfide, "Nocceler DM-P" manufactured by Ouchi-Shinko Chemical Industrial Co., Ltd.
It should be noted that the aforementioned carbon black (FEF grade) has N₂SA of 42 m²/g.

It is understood from Table 1 that the copolymers of Examples according to the present disclosure are unanimously excellent in fracture resistance, ozone resistance and wear resistance.

INDUSTRIAL APPLICABILITY

The copolymer of the present disclosure is applicable as a rubber component of a rubber composition or a resin component of a resin composition. The rubber composition of the present disclosure is applicable to various types of rubber products including a tire. Further, the resin composition of the present disclosure is applicable to various types of resin products.

The invention claimed is:

1. A copolymer containing at least an ethylene unit, a $C_{4-10}$ non-conjugated olefin unit and a conjugated diene unit, wherein a content of 3,4 or 1,2-vinyl bond in the conjugated diene unit is equal to or larger than 30 mol %, and a main chain of the copolymer is constituted of only acyclic structures.

2. The copolymer of claim 1, wherein the copolymer has a weight average molecular weight (Mw) of ≥50,000.

3. The copolymer of claim 1, wherein a content of the ethylene unit therein is in the range of 80 to 96 mol %, a content of the non-conjugated olefin unit therein is in the range of 3 to 19 mol %, and a content of the conjugated diene unit therein is in the range of 1 to 17 mol %.

4. The copolymer of claim 1, wherein the melting point thereof measured by differential scanning calorimetry (DSC) is 120° C. or lower.

5. The copolymer of claim 1, wherein the copolymer has a degree of crystallinity in the range of 5.0 to 50%.

6. The copolymer of claim 1, wherein the non-conjugated olefin unit is an α-olefin unit.

7. The copolymer of claim 6, wherein the non-conjugated olefin unit is at least one selected from 1-hexene unit and 1-octene unit.

8. The copolymer of claim 1, wherein the conjugated diene unit includes 1,3-butadiene unit and/or isoprene unit.

9. A rubber composition, wherein it contains the copolymer of claim 1.

10. A resin composition, wherein it contains the copolymer of claim 1.

11. A tire, wherein it uses the rubber composition of claim 9.

12. A resin product, wherein it uses the resin composition of claim 10.

13. The copolymer of claim 2, wherein a content of the ethylene unit therein is in the range of 80 to 96 mol %, a content of the non-conjugated olefin unit therein is in the range of 3 to 19 mol %, and a content of the conjugated diene unit therein is in the range of 1 to 17 mol %.

14. The copolymer of claim 2, wherein the melting point thereof measured by differential scanning calorimetry (DSC) is 120° C. or lower.

15. The copolymer of claim 2, wherein the copolymer has a degree of crystallinity in the range of 5.0 to 50%.

16. The copolymer of claim 2, wherein the non-conjugated olefin unit is α-olefin unit.

17. The copolymer of claim 16, wherein the non-conjugated olefin unit is at least one selected from 1-hexene unit and 1-octene unit.

18. The copolymer of claim 2, wherein the conjugated diene unit includes 1,3-butadiene unit and/or isoprene unit.

19. A tire, wherein it uses a rubber composition containing a copolymer, the copolymer containing at least an ethylene unit, a $C_{4-10}$ non-conjugated olefin unit and a conjugated diene unit, wherein a content of 3,4 or 1,2-vinyl bond in the conjugated diene unit is equal to or larger than 30 mol %.

* * * * *